United States Patent
Maloney et al.

(10) Patent No.: US 6,265,080 B1
(45) Date of Patent: Jul. 24, 2001

(54) PEST RESISTANT MOLYBDENUM DISILICIDE TYPE MATERIALS

(75) Inventors: Michael J. Maloney, Manchester; Donald Anton, Tolland; Dilip Shah, Glastonbury, all of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/469,851

(22) Filed: Dec. 22, 1999

(51) Int. Cl.[7] .................................................. B32B 15/04
(52) U.S. Cl. ....................... 428/472; 428/663; 501/96.3
(58) Field of Search ................................. 501/96.3, 97.1, 501/94, 96.1; 428/641, 663; 466/241 R, 241 B; 420/429

(56) References Cited

U.S. PATENT DOCUMENTS 5,429,997 * 7/1995 Hebsur .................................. 501/97

* cited by examiner

*Primary Examiner*—Deborah Jones
(74) *Attorney, Agent, or Firm*—Charles E. Sohl

(57) ABSTRACT

Pest-resistant molybdenum disilicide alloys containing rhenium. The addition of rhenium results in the formation of a thin protective oxide layer that suppresses pesting disintegration.

12 Claims, 1 Drawing Sheet

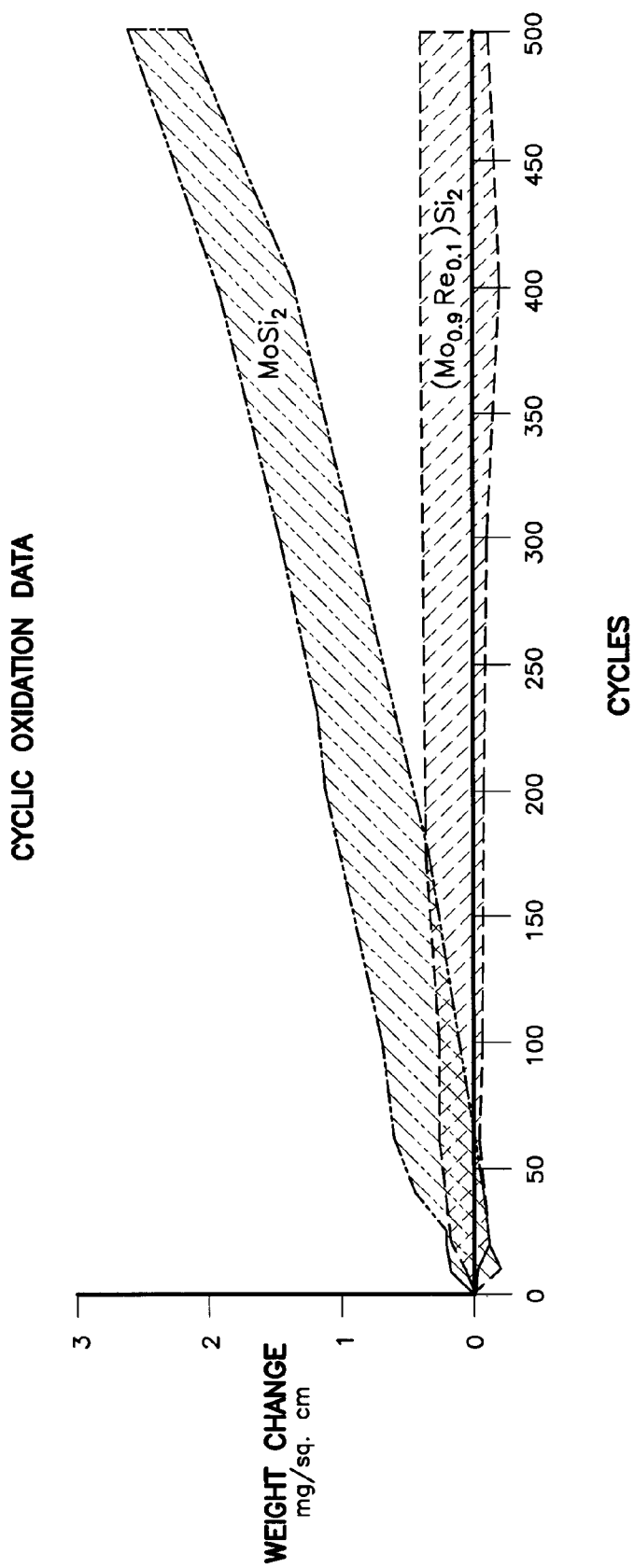

PEST RESISTANT MOLYBDENUM DISILICIDE TYPE MATERIALS

FIELD OF THE INVENTION

This invention relates to pest-resistant molybdenum disilicide type bulk materials and coatings.

BACKGROUND INFORMATION

Molybdenum disilicide is attractive for high temperature applications because of their strength, oxidation resistance (at most temperatures), and relatively low cost. It's commonly used as heating elements. It's high temperature properties also make it potentially useful in aerospace applications such as gas turbines, particularly as the gas turbine industry strives toward higher engine outputs and efficiencies through designs that operate at higher temperatures and stresses.

The current material family of choice for high temperature applications in gas turbine engines is the superalloy family. Molybdenum disilicide offers potential advantages compared to superalloys, including lower density and potentially higher use temperatures.

A significant limitation encountered by the prior art on the use of molybdenum disilicide has been pesting. Pesting is the rapid oxidation of the material at intermediate temperatures of about 300°–600° C., and is particularly rapid at about 500° C. It is believed that pesting occurs when molybdenum oxides such as $MoO_3$ form within microcracks in the material. As these oxides grow in volume, they mechanically wedge the cracks apart and eventually cause fracture.

Raj, in U.S. Pat. No. 5,330,590 discusses this phenomena and concludes that molybdenum disilicides are not suited for aircraft engine component applications.

U.S. Pats. Nos. 5,292,691, 5,292,692, and 5,308,806, issued to Maloney et al, disclose molybdenum disilicide composite materials and methods of manufacture. The references teach that composites may be produced from commercially available molybdenum disilicide powders reinforced by metallic or semi-metallic fibers for increased strength, creep resistance, and toughness.

Molybdenum disilicide materials possess a number of useful properties and it is desired to use them in high temperature applications. It is also desired that they be produced at relatively low cost.

It is therefore the object of the present invention to provide a molybdenum disilicide material that does not experience pesting.

Another object of the invention is to provide a relatively low cost molybdenum disilicide material.

Yet another object is to provide a pest resistant coating material based on $MoSi_2$.

SUMMARY OF THE INVENTION

The present invention derives from the discovery that partially replacing the molybdenum in molybdenum disilicide with rhenium effectively eliminates pesting. Several mechanisms may explain the suppression of pesting. Rhenium may help form a stable and protective oxide layer, which may suppress further oxidation or it may reduce the volumetric expansion and volatility of $MoO_3$. Another potential mechanism may be reduction in anisotropy of thermal expansion of $MoSi_2$. Since $MoSi_2$ with $C11_b$ crystal structure is non-cubic, thermal expansion is expected to be different in different crystallographic direction. In a polycrystalline aggregate of such a non-cubic material, the resulting differential in contraction upon cool down is likely to cause residual stress in the grain boundaries at lower temperatures. This can promote oxygen diffusion along grain boundaries and lead to pesting. Adding rhenium may reduce the anisotropy of thermal expansion.

The amount of rhenium required to eliminate pesting, on an atomic basis is from 2 to 50% of the sum of the Mo and Re, and preferably from 5 to 40% of the sum of Mo and Re. Expressed as a formula, the broad invention composition range comprises $(Mo_aRe_bX_c)(Si_dZ_e)$ where:

a. a+b+c=1
b. d+e=2
c. b=0.02–0.5
d. X is selected from the group consisting essentially of Cr, Ti, Fe, Co, Ni and mixtures thereof.
e. c=0–0.2
f. Z=is selected from the group consisting essentially of B, Ge, Al, Ga, Sn, Sb, Bi and mixtures thereof.
g. d=1.8–2.0
h. e=0–0.2

The invention allows the use of molybdenum disilicide type materials in high temperature applications such as aircraft engines and heating elements without the danger of pesting oxidation damage. The invention material may also be used as a coating.

BRIEF DESCRIPTION OF THE DRAWING

FIG. 1 shows a graphical comparison of the oxidation weight gain of molybdenum disilicide and rhenium-containing molybdenum disilicide test samples.

DESCRIPTION OF THE PREFERRED EMBODIMENTS

The present invention relates to modified molybdenum disilicide materials in which pesting is suppressed $(Mo_aRe_bX_c)(Si_dZ_e)$ in which:

a. a+b+c=1
b. d+e=2
c. b=0.02–0.5, and preferably 0.05–0.4.
d. X is selected from the group consisting essentially of Cr, Ti, Fe, Co, Ni and mixtures thereof
e. c=0–0.2 and preferably 0–0.1.
f. Z=is selected from the group consisting essentially of B, Ge, Al, Ga, Sn, Sb, Bi and mixtures thereof
g. d=1.8–2.0
h. e=0–0.2 and preferably 0–0.1.

We prefer that the material have a $MoSi_2$ type crystal structure and that less than 10 vol % of extraneous, non $MoSi_2$ structure phases be present.

The invention also includes the use of a thin layer of the invention $MoSi_2$ type material as a coating on a substrate.

The range of rhenium content that suppresses pesting in $MoSi_2$ is broad. Table 1 shows test results of three material samples exposed to air at 932° F. (500° C.) for 70 hours. While the $MoSi_2$ completely disintegrated, into a fine mixture of $MoO_3$ and $Mo\ Si_2$ powder, under the test conditions, the rhenium-containing alloys exhibited no evidence of pesting. FIG. 1 shows the weight gain results of several samples subjected to cycling from room temperature to 500° C. in air for a total of 500 one-hour cycles. The test was designed to model the thermal cycling experienced by aircraft engine components such as blade outer air seals. The weight change represents the amount of oxygen reacting with the material to form oxides, and indicates the rate and degree of oxidation. The $MoSi_2$ samples exhibited significant weight gain, as a result of the rapid formation of molybdenum oxides. This oxidation occurred at a linear or even accelerating rate, illustrating rapid oxidation/pesting of the material. However, the $(Mo_{0.9}Re_{0.1})Si_2$ and $(Mo_{0.5}Re_{0.5})Si_2$ materials displays a small initial weight gain during formation of the protective surface oxide but then remained stable with no pesting.

TABLE 1

| Material | Result |
| --- | --- |
| $MoSi_2$ | 100% Disintegration |
| $(Mo_{0.9}Re_{0.1})Si_2$ | No Pesting |
| $(Mo_{0.5}Re_{0.5})Si_2$ | No Pesting |

The invention may be produced by a variety of powder metallurgy processes known to those skilled in the art. The alloy may, for example, be produced in a fashion similar to techniques currently used to fabricate molybdenum disilicide articles.

The invention material may be produced by first mixing molybdenum, rhenium and silicon, and other elements as desired, in the correct proportions to produce the desired composition. The atomic ratio of Mo:Re:Si to produce (Mo0.9,Re0.1)Si2, for example, is 0.9:0.1:2. The powder mixture may be placed into a water cooled copper crucible and melted by vacuum arc melting to produce a solidified mass. The melting procedure may be repeated, to ensure a uniform distribution of the constituent elements. A cast ingot results, and in some cases a useful article may be machined directly from the ingot. For most applications, however, using such a cast structure in a final product is not desirable because of the likelihood of solidification induced defects that may be detrimental to mechanical integrity.

The preferred procedure is to reduce the solidified ingot to a fine powder. The fine powder is placed in a metal can, which may be made of niobium, that is evacuated and sealed. The encapsulated powder may then consolidated by hot isostatic pressing at 1600° C. for 4 hours at a pressure of 10,000 pounds per square inch, and under these conditions the can collapses and transmits the external gas pressure to the powder causing it to be consolidated and bonded into a fully dense homogeneous material. The niobium can may then be removed by mechanical or chemical means. A final $(Mo_a Re_b X_c)(Si_d Z_e)_a$ article may then be machined out of the consolidated powder article by electrodischarge machining. Other compaction and machining processes may also be used.

The pesting resistant material of the invention may be used as a protective coating on metallic substrates including $MoSi_2$, molybdenum and molybdenum alloys niobium and niobium alloys, and tungsten and tungsten alloys; and chromium and chromium alloys, on ceramic substrates including silicon carbide and silicon nitride, and the materials described in U.S. Pats. Nos. 5,292,691, 5,292,692; and 5,308,806 which are expressly incorporated herein by reference.

One skilled in the art can also select a one composition within the scope of the present invention whose mechanical properties are optimized for a particular application for a substrate, and another composition from within the scope of the invention whose properties are optimized for environmental resistance, including oxidation resistance, for use as a coating on the previously selected substrate.

The applicability of coating of the invention material to a particular substrate can be readily assessed by one skilled in the art through consideration of chemical compatibility and stability, and comparison of the coefficient of thermal expansion of the invention material with the coefficient of thermal expansion of the substrate. The coating may be applied by a variety of techniques including sputtering, cathodic arc deposition, plasma spray, HVOF, detonation gun etc. The coating may have a thickness of from 0.1 mil to 20 mils and preferably 0.5 mil to 5 mils.

The present invention provides molybdenum disilicide type that may be used at elevated temperatures without undergoing pesting oxidation. It thus allows exploitation of the beneficial properties of molybdenum disilicide and its alloys in many environments in which they previously could not be utilized due to pesting.

Although this invention has been shown and described with respect to detailed embodiments thereof it will be understood by those skilled in the art that various changes, omissions, and additions in form and detail thereof may be made without departing from the spirit and scope of the claimed invention.

We claim:

1. A pesting resistant composition comprising $(Mo_a, Re_b, X_c)(Si_d, Z_e)$ wherein:
   a. a+b+c=1
   b. d+e=2
   c. b=0.02–0.5.
   d. X is selected from the group consisting of Cr, Ti, Fe, Co, Ni and mixtures thereof.
   e. c=0–0.2
   f. d=1.8–2.0
   g. Z=is selected from the group consisting of B, Ge, Al, Ga, Sn, Sb, Bi and mixtures thereof.
   h. e=0–0.2

2. A composition as in claim 1 wherein c=0–0.1.
3. A composition as in claim 1 wherein b=0.05–0.4.
4. A composition as in claim 1 wherein d =e=0–0.01.
5. A composition as in claim 1 wherein a+b=1 and b=0.02–0.5 and d=2.0.
6. A composition as in claim 1 wherein phases other than those based on $MoSi_2$ comprise less than 10 vol % of the material.
7. A gas turbine component comprising the composition of any one of claims 1 through 6.
8. A heating element comprising the composition of any one of claims 1 through 6.
9. A coated article having a substrate selected from the group consisting of $MoSi_2$, Mo, Mo alloys, Nb, Nb alloys, W and W alloys, Ta and Ta alloys, Cr and Cr alloys, Si C and $Si_3 N_4$ and composites based on such materials, said substrate having a coating comprising the composition of one of claims 1 through 6.
10. A coated article as in claim 9 which comprises a gas turbine component.
11. A coated article comprising a substrate having a composition chosen form the compositions of claim 1 and a coating on said substrate having a composition which differs from that of the substrate, but which also falls within the scope of claim 1.
12. A coated article as in claim 11 which comprises a gas turbine component.

* * * * *